United States Patent [19]

Clampitt et al.

[11] 3,848,673

[45] *Nov. 19, 1974

[54] RECOVERY OF HYDROCARBONS

[75] Inventors: Richard L. Clampitt; James E. Hessert, both of Bartlesville, Okla.

[73] Assignee: Phillips Petroleum Company, Bartlesville, Okla.

[ * ] Notice: The portion of the term of this patent subsequent to Jan. 10, 1990, has been disclaimed.

[22] Filed: Feb. 26, 1973

[21] Appl. No.: 335,810

[52] U.S. Cl. ............... 166/275, 166/273, 166/294, 166/300

[51] Int. Cl. ............................................ E21b 43/16

[58] Field of Search ......... 61/36 R; 166/244 C, 270, 166/275, 294, 295, 300, 310

[56] References Cited
UNITED STATES PATENTS

| | | | |
|---|---|---|---|
| 2,760,584 | 8/1956 | Rohrback | 166/310 |
| 3,082,823 | 3/1963 | Hower | 166/294 |
| 3,435,899 | 4/1969 | Ramos et al. | 61/36 R |
| 3,438,439 | 4/1969 | Froning | 166/300 |
| 3,502,149 | 3/1970 | Pence | 166/294 |
| 3,611,732 | 10/1971 | Epstein | 61/36 R |
| 3,618,667 | 11/1971 | Snavely | 166/275 |
| 3,704,750 | 12/1972 | Miles et al. | 166/300 |
| 3,727,687 | 4/1973 | Clampitt et al. | 166/294 |
| 3,741,307 | 6/1973 | Sandiford et al. | 166/300 |
| 3,749,172 | 7/1973 | Hessert et al. | 166/275 |

Primary Examiner—Stephen J. Novosad
Assistant Examiner—Jack E. Ebel

[57] ABSTRACT

Improvements in recovery operations for the recovery of hydrocarbons from subterranean formations are accomplished through the use of aqueous mediums comprising aqueous gels prepared in situ from water and cellulose ethers.

27 Claims, No Drawings

RECOVERY OF HYDROCARBONS

This invention relates to the recovery of oil from subterranean formations.

The secondary recovery of oil from oil-bearing or containing subterranean formations by fluid drive processes wherein a fluid is injected into the formation via one or more injection wells to drive the oil through the formation to one or more production wells is a well-known process. Fluids used in such processes include liquids, such as water and various hydrocarbons, and gases such as hydrocarbon gases, carbon dioxide, etc. Many oil reservoirs comprise layers or zones of porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances, such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Another problem which is encountered in the recovery of desired hydrocarbons from subterranean formations occurs where the formation also comprises a zone of undesired fluid associated with or in contact with the zone of desired hydrocarbons in the formation. For example, said zone of undesired fluid can comprise a gas zone overlying an oil deposit, a water zone underlying an oil deposit or zone, or a water zone underlying a natural gas zone when the gas is the desired hydrocarbon. Usually, said zone of undesired fluid will be in contact with, or at least in communication with, the zone or deposit of desired hydrocarbon. In such instances, upon continued production of the desired hydrocarbon, said zone of undesired fluid can encroach upon the zone or deposit of desired hydrocarbon and reduce the production thereof. This encroachment can occur in at least one of several ways including ($a$) coning around the well bore through which the desired hydrocarbon is being produced, or ($b$) via a fracture or other fissure interconnecting the zone of desired hydrocarbon and the zone of undesired fluid.

The present invention provides a solution for the above-described problems. In our copending application Ser. No. 159,052, filed July 1, 1971, now U.S. Pat. 3,727,687 issued Apr. 17, 1973, there is disclosed a class of new aqueous gels which can comprise at least a portion of the aqueous medium used in said secondary recovery operations, and which can be used to prevent or at least reduce said encroachment. It is there disclosed that water-soluble cellulose ethers when used in combination with a water-soluble compound of a polyvalent metal which can be reduced to a lower polyvalent valence state and a suitable reducing agent capable of reducing at least a portion of said polyvalent metal to said lower polyvalent valence state can be used to gel aqueous mediums comprising water. By varying the composition and/or amounts of said gelling agents, and/or the conditions under which they are used in forming the gels, a wide range of aqueous gels ranging from liquid highly mobile gels to rigid gels can be produced. The present invention provides methods for forming said gels in situ in the formation to be treated.

Thus, according to the invention, there is provided a method of treating a subterranean formation, penetrated by at least one borehole, with a fluid medium comprising an aqueous gel, which method comprises: adding to water containing a water-thickening amount of water-soluble cellulose ether, an amount of a water-soluble compound of a polyvalent metal wherein the metal present is capable of being reduced to a lower polyvalent valence state, said amount of metal compound being sufficient to cause gelation of said water when the valence of at least a portion of said metal therein is reduced to said lower valence state; injecting said water containing said cellulose ether and said metal-containing compound into said borehole and into said formation; and contacting said water in said formation with an amount of a reducing gas which is effective to reduce at least a portion of said metal to said lower valence state.

In general, any of the water-soluble cellulose ethers can be used in the practice of the invention. Said cellulose ethers which can be used include, among others: the various carboxyalkyl cellulose ethers, e.g., carboxyethyl cellulose and carboxymethyl cellulose (CMC); mixed ethers such as carboxyalkyl hydroxyalkyl ethers, e.g., carboxymethyl hydroxyethyl cellulose (CMHEC); hydroxyalkyl celluloses such as hydroxyethyl cellulose, and hydroxypropyl cellulose; alkylhydroxyalkyl celluloses such as methylhydroxypropyl cellulose; alkyl celluloses such as methyl cellulose, ethyl cellulose, and propyl cellulose; alkylcarboxyalkyl celluloses such as ethylcarboxymethyl cellulose; alkylalkyl celluloses such as methylethyl cellulose; and hydroxyalkylalkyl celluloses such as hydroxypropylmethyl cellulose; and the like. Many of said cellulose ethers are available commercially in various grades. The carboxy-substituted cellulose ethers are available as the alkali metal salt, usually the sodium salt. However, the metal is seldom referred to and they are commonly referred to as CMC, CMHEC, etc. For example, water-soluble CMC is available in various degrees of carboxylate substitution ranging from about 0.3 up to the maximum degree of substitution of 3.0. In general, CMC having a degree of substitution in the range of 0.65 to 0.95 is preferred. Frequently, CMC having a degree of substitution in the range of 0.85 to 0.95 is a more preferred cellulose ether. CMC having a degree of substitution less than the above-preferred ranges is usually less uniform in properties and thus less desirable for use in the practice of the invention. CMC having a degree of substitution greater than the above-preferred ranges usually has a lower viscosity and more is required in the practice of the invention. Said degree of substitution of CMC is commonly designated in practice as CMC-7, CMC-9, CMC-12, etc., where the 7, 9, and 12 refer to a degree of substitution of 0.7, 0.9, and 1.2, respectively.

In the above-described mixed ethers, it is preferred that the portion thereof which contains the carboxylate groups be substantial instead of a mere trace. For example, in CMHEC it is preferred that the carboxymethyl degree of substitution be at least 0.4. The degree of hydroxyethyl substitution is less important and can vary widely, e.g., from about 0.1 or lower to about 4 or higher.

The amount of cellulose ether used in the practice of the invention can vary widely depending upon the viscosity grade and purity of the ether, and properties desired in the aqueous gels. In general, the amount of cellulose ether used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Water containing 25 ppm of CMC has a viscosity increase of about 21 percent. At 50 ppm the viscosity increase is about 45 percent. At 100 ppm the viscosity increase is about 195 percent. Generally speaking, amounts in the range of from 0.0025 to 20, preferably from 0.01 to 5, more preferably 0.025 to 1, weight percent, based on the weight of water, can be used. However, amounts outside said ranges can be used. In general, with the proper amounts of polyvalent metal and reducing agent, the amount of cellulose ether used will determine the consistency of the gel obtained. Small amounts of cellulose ether will usually produce liquid mobile gels which can be readily pumped whereas large amounts of cellulose ether will usually produce stiff rigid gels. The amount of cellulose ether used will depend, to some extent at least, upon the nature of the formation being treated. For example, less mobile gels can be used in more permeable formations. Thus, there is really no fixed upper limit on the amount of cellulose ether which can be used.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the particular type of cellulose ether used, the concentration of the cellulose ether in the water to be gelled, the water which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 0.05 to 60, preferably 0.5 to 30, weight percent of the amount of the cellulose ether used. Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of cellulose ether. Preferably, the amount of said metal capable of being reduced which is used will not exceed $4 \times 10^{-3}$, more preferably $2 \times 10^{-3}$, gram atoms of said metal per gram of cellulose ether. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, when brines, such as are commonly available in producing oil fields, are used as the water in preparing the gels used in the practice of the invention, less of the starting polyvalent metal-containing compound is required than when distilled water is used. Stable gels can be prepared using brines having a wide range of dissolved solids content, e.g., from 850, 1,200, 6,000, and 90,000 ppm dissolved solids. Gelation rates are frequently faster when using said brines. Such oil field brines common contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled as described herein.

The reducing gases which can be used in the practice of the invention include hydrogen sulfide and hydrogen sulfide-containing gases, e.g., natural gas containing hydrogen sulfide. Said hydrogen sulfide can be naturally occurring hydrogen sulfide and can be associated with said desired hydrocarbon fluid, e.g., admixed therewith, or can be associated with said undesired fluid, e.g., admixed therewith. If there is insufficient hydrogen sulfide present in the formation, it is within the scope of the invention to inject hydrogen sulfide into the formation, either into association with said desired hydrocarbon fluid or into association with said undesired fluid. The only requirement in accordance with the invention is that the cellulose ether solution containing the starting polyvalent metal compound contact the hydrogen sulfide in the formation. The amount of hydrogen sulfide present in the formation, either naturally occurring or injected, can vary widely. For example, when the hydrogen sulfide is associated with a gas phase, e.g., natural gas, it is preferred that it be present in an amount of at least about 0.25, more preferably at least about 0.5, volume percent in the gas phase. When the hydrogen sulfide is associated with a liquid phase, e.g., oil or water in the formation, it is preferred that it be present in an amount of at least about 15, more preferably at least about 100, parts per million by weight of said liquid phase.

The amount of reducing gas actually used in the practice of the invention will be a small but finite amount which is effective or sufficient to reduce at least a portion of the higher valence metal in the starting polyvalent metal-containing compound to a lower polyvalent valence state. Thus, the amount of reducing gas used depends, to some extent at least, upon the amount of the starting polyvalent metal-containing compound which is used. As a general guide, the amount of reducing gas used will generally be within the range of from 0.1 to at least 150 weight percent of the stoichiometric amount required to reduce the metal in the starting polyvalent to said lower polyvalent valence state, e.g., +6 Cr to +3 Cr. However, in some instances, it may be desirable to use amounts of reducing gas outside said ranges. The use of such amounts is within the scope of the invention. Those skilled in the art can determine the amount of reducing gas to be used by simple experiments carried out in the light of this disclosure.

Various methods can be used for preparing the aqueous gels used in the practice of the invention. Generally speaking, where convenient, the preferred method is to first disperse the cellulose ether in the water or other aqueous medium. The metal-containing compound is then added to the solution or aqueous medium containing the cellulose ether, with stirring. Gelation starts as soon as the solution contacts the reducing gas and reduction of some of the higher valence metal in the starting polyvalent metal-containing compound to a lower valence state occurs. The newly-formed lower valence metal ions, for example +3 chromium obtained from +6 chromium, effect rapid crosslinking of the cellulose ethers and gelation of the solution or aqueous medium containing same.

It is also within the scope of the invention to prepare a dry mixture of the cellulose ether and the metal-containing compound, in proper proportions, and then add this dry mixture to the proper amount of water.

An advantage of the invention is that ordinary ambient temperatures and other conditions can be used in practically all instances in preparing the aqueous gels of the invention or aqueous mediums containing same.

Aqueous gels used in the practice of the invention can be prepared having a wide range of viscosities or firmness ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the type and concentration of the cellulose ether, the type and amount of starting polyvalent metal compound used, and the type and amount of reducing agent used.

We are aware that chromium ions having a valence of +3 have been used to react with water-dispersible polymers such as polyacrylamides and polysaccharides. See, for example, U.S. Pat. No. 3,114,651 to Gentile and U.S. Pat. No. 3,383,307 to Goetz. In such processes the chromium compound is added in a form wherein the chromium has an initial valence of +3, e.g., $CrCl_3$, $Cr(NO_3)_3$, etc. We have found that thus-obtained $Cr^{+3}$ ions do not produce stable gels with cellulose ethers. The gels so produced either undergo syneresis or precipitation within a few minutes. In the practice of the present invention, the $Cr^{+3}$ ions must be newly formed, e.g., nascent ions formed in situ in the solution to be gelled.

Gel instability is evidenced by precipitation and/or syneresis (bleeding or water separation). A severe test of gel stability is to prepare the gel and merely allow it to stand. We have found that gels which are stable for as long as 48 hours are usually stable for a month or longer. We have also found that formation solids such as sandstone and limestone promote gel stability.

Herein and in the claims, unless otherwise specified, the aqueous gels used in the practice of the invention are defined for convenience, and not by way of limitation, in terms of the amount of cellulose ether contained therein, irrespective of whether or not all the cellulose ether is crosslinked. For example, a 1 weight percent or 10,000 ppm gel is a gel which was prepared from a starting cellulose ether solution which contained 1 weight percent or 10,000 ppm by weight of cellulose ether.

As indicated above, said aqueous gels are useful in fluid drive operations for the secondary recovery of oil. Said gels are applicable to decreasing the mobility of a drive fluid, such as water, or decreasing the permeability of formations prior to or during secondary recovery operations, such as fluid drive processes. Said gels are also applicable for shutting off or reducing flow of undesired fluids in producing wells.

In one embodiment of the invention, a conventional waterflood or gas drive for the secondary recovery of oil is carried out in conventional manner until the drive fluid breaks through into the production well in excessive amounts. Water containing a cellulose ether, e.g., CMC, and a polyvalent metal compound, e.g., sodium dichromate, in amounts as described above is then pumped down the well and into the formation where it contacts hydrogen sulfide associated with said oil. Upon contacting the hydrogen sulfide, the +6 chromium in the sodium dichromate is reduced to +3 chromium and gelation ensues. While it is not intended to limit the invention by any theories of operation, it is presently believed that the in situ gelation which occurs is progressive in nature. Upon continued injection, some of the ungelled solution fingers through the newly formed gel and there is an intermingling thereof with the oil and contact with hydrogen sulfide in the formation, e.g., associated with the oil, with resultant formation of additional gel. The gel, being more viscous than the drive fluid, will effect a decrease in mobility of the drive fluid, and/or will tend to enter the more permeable portions of the formation. The injection of the ungelled solution into the formation can be carried out in any suitable manner, any suitable amount, and for any desired period of time sufficient to obtain the desired in-depth penetration and decrease in mobility of the drive fluid, and/or decrease in permeability of the high permeability zones of the formation. Usually, an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.001 to about 0.5 pore volume of a cellulose ether-polyvalent metal solution in accordance with the invention over a suitable period of time ranging from one day to six months. Or, the injection of said solution can be carried out by injecting a slug of about 200 to 5,000 barrels of solution into the well and then into the formation and into contact with the reducing gas therein. Injection in one of the above manners will provide a flood front adjacent the oil to be produced. If desired, an ordinary brine or water can then be employed to drive this slug or band or front of resultant gel on through the formation to the production well. If desired, in order to avoid any sharp demarcations in viscosity or mobility of the gel, which could adversely affect the relative mobility of the flood medium and the oil, and cause channeling, the viscosity or concentration of the gel-forming solution can gradually be lessened through a series of incremental decreases rather than discontinuing the injection thereof abruptly.

In another embodiment of the invention, the formation can be treated prior to carrying out the fluid drive secondary recovery operations. This embodiment is particularly applicable where there is good knowledge of the nature of the formation. Thus, in a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still other embodiments, the invention can be applied to producing wells, either oil wells or gas wells, where there is a stratum or zone containing an undesired fluid adjacent the desired hydrocarbon-bearing stratum or zone. For example, such a condition can exist where there is a water sand underlying the desired hydrocarbon-bearing (either oil or gas) sand and the water encroaches or intrudes into said hydrocarbon-bearing sand and interferes with the production of the desired hydrocarbon. Another example is when a gas-containing sand or zone overlies a petroleum deposit or zone and the petroleum or oil is the hydrocarbon it is desired to produce. In such instances, the formation can be treated in accordance with the invention to shut off or at least reduce the flow of undesired fluid. The method of carrying out such a treatment is similar to or substantially the same as that described above in connection with fluid drive operations.

For example, when the encroachment of the undesired fluid is via a fracture or fissure connecting the zone of desired hydrocarbon and the zone of undesired fluid, the well can be taken off production and the gel-forming solution injected into the zone of desired hydrocarbon. Upon contact with hydrogen sulfide, gelation will occur as described above. The resulting gel will tend to enter the fracture(s) or fissure(s) connecting the two zones. After the desired period of injection, the well can be returned to production. If desired, the well can be maintained in a shut-in condition for a short period, e.g., 0.5 to 4 days. The gel entering said fracture(s) or fissure(s) will tend to remain in place therein.

When there is a more or less well-defined interface in the formation between a zone of undesired fluid and a zone of desired hydrocarbon, e.g., a gas cap overlying an oil deposit with the oil being the desired hydrocarbon, and the location of said interface is known, the gel-forming solution can be injected along said interface. For example, said interface can be isolated with suitable packers placed above and below same, and the casing perforated between the packers. The gel-forming solution is then pumped through the perforations and into the formation along the general region of said interface. Upon contacting hydrogen sulfide associated with either the gas or the oil, gelation occurs and a barrier is formed along said interface. In a modification of this embodiment and when the hydrogen sulfide is associated at least primarily with the gas cap, the gel-forming solution can be pumped into the gas zone portion of the formation slightly above the level of the interface by proper packer and perforation location.

Coning is a well-known problem which is frequently encountered in producing wells, both gas wells and oil wells. An overlying gas cap or zone will frequently tend to cone downwardly around the well bore and into an underlying oil deposit or zone. In such situations, by the proper location of packers and perforations as described above, the gel-forming solution can be pumped into the formation along, or slightly above, the level of the original interface and gelation occurs upon contact with hydrogen sulfide, as described. If desired, and particularly when the coning is severe enough to essentially block the flow of oil from the oil zone, said oil zone can be protected by the simultaneous injection of oil down the tubing and into said oil zone through perforations located below the bottom packer isolating said interface. This last modification is particularly useful when the hydrogen sulfide is primarily associated with the overlying gas cap.

Similarly, an underlying water zone will frequently tend to cone upwardly around the well bore and into an overlying gas zone or oil zone. This problem can also be solved in accordance with the invention by employing methods similar to those described above.

If desired, particularly when treating a producing well, the well bore area can be given a small acid pretreatment. This can be accomplished by the injection of a small slug, e.g., 500–1,000 gallons, of 15 percent hydrochloric acid. One purpose of this treatment is to remove any scale and/or acid-soluble materials near the well bore. Preferably, the acid treatment is followed with an injection of field brine, e.g., 200–300 barrels, to flush the acid. In some instances, it may be desirable to follow said brine flush with a slug, e.g., 400–500 barrels, of cellulose ether solution which does not contain polyvalent metal compound. This will permit some of the polymer to penetrate deeper into the permeable formation. The gel-forming solution, e.g., 1,000–1,500 barrels, is then injected for contact with hydrogen sulfide and gelation as described above. Preferably, the gel-forming solution is followed with a slug of field brine or water, e.g., 500 barrels, to flush the gel-forming solution from the well bore and out into the formation. Generally, it is then preferred to inject a small slug of lease crude oil, e.g., about 200 barrels, to reestablish or maximize the relative permeability of the formation to oil in the well bore area. The above-named quantities are given by way of example only and are not limiting on the invention. Said quantities can vary widely from formation to formation, and even from well to well.

In all the above-described embodiments of the invention, the injection of the gel-forming solution can be carried out in an intermittent manner, e.g., intermittent slugs of gel-forming solution interspersed with slugs of water or brine, an interspersed with slugs of cellulose ether solution which do not contain the starting polyvalent metal compound.

It is within the scope of the invention to carry out the formation treatments of the invention periodically or intermittently, as needed, during the course of a fluid drive secondary operation, or during the course of oil or gas production from a producing well.

In all of the above operations, the injection of the gel-forming solutions can be carried out in conventional manner. Gel-forming solutions injected in accordance with the invention can be prepared in advance, stored in suitable tanks, and then pumped into the well. Or, said solutions can be formed in a conduit leading to the injection well, or in the tubing in the well itself, and then injected into the formation. Thus, the required amounts of cellulose ether, and polyvalent metal compound, can be metered into the tubing in the well, mixed therein, and then injected into the formation for contact with hydrogen sulfide in accordance with the invention.

EXAMPLE

A 5,000 ppm solution of CMC 9 mixed in Bartlesville tap water was treated with hydrogen sulfide gas for 30 minutes. The hydrogen sulfide was bubbled into the solution while stirring on a magnetic stirrer. After 30 minutes the solution was tested for sulfides with lead acetate test paper. The test was positive and the viscosity of the solution was 90 cp at 170 sec$^{-1}$ when tested on Model 35, Fann VG meter. Next, 1200 ppm of sodium dichromate dihydrate was added to the solution. Within a few minutes the solution turned green and formed a viscous jelly-like mass. After gelation the viscosity was beyond the range of the Fann Viscometer at 100 rpm (greater than 900 cp).

An identical solution of CMC that had also been treated with hydrogen sulfide and which had a viscosity of 90 cp at 170 sec$^{-1}$ showed no gelation without the dischromate addition.

The above example shows that hydrogen sulfide is an effective reducing agent for reducing +6 chromium to +3 chromium and causing the gelation of CMC solutions containing said +6 chromium.

Whie certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. A method of treating a subterranean formation, penetrated by at least one borehole, with a fluid medium comprising an aqueous gel, which method comprises:
   adding to water containing a water-thickening amount of a water-soluble cellulose ether, an amount of a water-soluble compound of a polyvalent metal wherein the metal present is capable of being reduced to a lower polyvalent valence state, said amount of metal compound being sufficient to cause gelation of said water when the valence of at least a portion of said metal therein is reduced to said lower valence state;
   injecting said water containing said cellulose ether and said metal-containing compound into said borehole and into said formation; and
   contacting said water in said formation with an amount of a reducing gas which is effective to reduce at least a portion of said metal to said lower valence state.

2. A method according to claim 1 wherein the amount of said water-soluble polyvalent metal compound is an amount sufficient to supply at least 3 × 10$^{-6}$ gram atoms of said metal capable of being reduced to said lower polyvalent valence state per gram of said cellulose ether.

3. A method according to claim 1 wherein:
   said amount of said cellulose ether is within the range of from 0.0025 to 20 weight percent, based upon the weight of said water;
   said amount of said polyvalent metal compound is within the range of from 0.05 to 60 weight percent, based upon the weight of said cellulose ether; and said amount of said reducing gas is within the range of from 0.1 to at least about 150 percent of the stoichiometric amount required to reduce said polyvalent metal to said lower polyvalent valence state.

4. A method according to claim 1 wherein said cellulose ether is a carboxymethyl cellulose ether.

5. A method according to claim 1 wherein said compound of a polyvalent metal is a compound of chromium wherein the valence of the chromium is +6 and the valence of at least a portion of said chromium is reduced to +3.

6. A method according to claim 5 wherein said chromium compound is selected from the group consisting of ammonium chromate, ammonium dichromate, the alkali metal chromates and dichromates, chromium trioxide, and mixtures thereof.

7. A method according to claim 6 wherein said reducing gas is hydrogen sulfide or a hydrogen sulfide-containing gas.

8. A method according to claim 3 wherein:
   said cellulose ether is sodium carboxymethyl cellulose;
   said polyvalent metal compound is sodium dichromate; and
   said reducing gas is hydrogen sulfide or a hydrogen sulfide-containing gas.

9. A method according to claim 4 wherein:
   said amount of said cellulose ether is within the range of from 0.01 to 5 weight percent, based upon the weight of said water;
   said amount of said polyvalent metal compound is within the range of from 0.05 to 60 weight percent, based upon the weight of said cellulose ether; and said amount of said reducing gas is within the range of from 0.1 to at least about 150 weight percent of the stoichiometric amount required to reduce said polyvalent metal to said lower polyvalent valence state.

10. A method according to claim 9 wherein:
    said compound of a polyvalent metal is a compound of chromium wherein the valence of the chromium is +6 and the valence of at least a portion of said chromium is reduced to +3.

11. A method according to claim 10 wherein:
    said cellulose ether is sodium carboxymethyl cellulose;
    said polyvalent metal compound is selected from the group consisting of sodium dichromate, potassium dichromate, and mixtures thereof; and said reducing gas is selected from the group consisting of hydrogen sulfide and hydrogen sulfide-containing gases.

12. A method according to claim 9 wherein:
said amount of said cellulose ether is within the range of from 0.025 to 1 weight percent, based upon the weight of said water;
said amount of said polyvalent metal compound is within the range of from 0.5 to 30 weight percent, based upon the weight of said cellulose ether; and said amount of said reducing gas is within the range of from 0.5 to at least about 150 percent of the stoichiometric amount required to reduce said polyvalent metal to said lower polyvalent valence state and cause gelation of said water.

13. A method according to claim 12 wherein:
said cellulose ether is a carboxymethyl cellulose ether;
said polyvalent metal compound is selected from the group consisting of sodium dichromate, potassium dichromate, and mixtures thereof; and
said reducing agent is selected from the group consisting of hydrogen sulfide and hydrogen sulfide-containing gases.

14. A method according to claim 1 wherein:
said borehole comprises an injection well;
said formation comprises an oil-bearing formation and is also penetrated by a production well;
said method is a fluid drive process carried out for the recovery of oil from said formation by injecting a drive fluid into said formation via said injection well and driving oil to said production well; and
said drive fluid comprises said aqueous gel and is introduced into said injection well and into the pores of said formation.

15. A method according to claim 14 wherein:
said formation is of nonuniform permeability and comprises at least one zone of relatively high permeability and at least one zone of relatively low permeability; and
said drive fluid is injected into said formation prior to having injected another drive fluid into said formation via said injection well in said fluid drive process for driving said oil to said production well.

16. A method according to claim 15 wherein:
said amount of said cellulose ether is within the range of from 0.025 to 1 weight percent, based upon the weight of said water;
said amount of said polyvalent metal compound is within the range of from 0.5 to 30 weight percent, based upon the weight of said cellulose ether; and said amount of said reducing gas is within the range of from 0.5 to at least about 150 percent of the stoichiometric amount required to reduce said polyvalent metal to said lower polyvalent valence state and cause gelation of said water.

17. A method according to claim 16 wherein:
said cellulose ether is sodium carboxymethyl cellulose;
said polyvalent metal compound is sodium dichromate; and
said reducing gas is hydrogen sulfide or a hydrogen sulfide-containing gas.

18. A method according to claim 14 wherein:

said formation is of nonuniform permeability and comprises at least one zone of relatively high permeability and at least one zone of relatively low permeability; and
said drive fluid is injected into said formation subsequent to having injected another drive fluid into said formation via said injection well in said fluid drive process for driving said oil to said production well.

19. A method according to claim 18 wherein:
said amount of said cellulose ether is within the range of from 0.025 to 1 weight percent, based upon the weight of said water;
said amount of said polyvalent metal compound is within the range of from 0.5 to 30 weight percent, based upon the weight of said cellulose ether; and said amount of said reducing gas is within the range of from 0.5 to at least about 150 percent of the stoichiometric amount required to reduce said polyvalent metal to said lower polyvalent valence state and cause gelation of said water.

20. A method according to claim 19 wherein:
said cellulose ether is sodium carboxymethyl cellulose;
said polyvalent metal compound is sodium dichromate; and
said reducing gas is hydrogen sulfide or a hydrogen sulfide-containing gas.

21. A method according to claim 1 wherein:
said borehole comprises a producing well;
said formation comprises a hydrogen-bearing formation; and
said method comprises a method for recovering desired fluid hydrocarbons from said formation, and for reducing the concomitant production of undesired fluids with said desired hydrocarbons.

22. A method according to claim 21 wherein:
said amount of said cellulose ether is within the range of from 0.01 to 5 weight percent, based upon the weight of said water;
said amount of said polyvalent metal compound is within the range of from 0.05 to 60 weight percent, based upon the weight of said cellulose ether; and said amount of said reducing gas is within the range of from 0.1 to at least about 150 weight percent of the stoichiometric amount required to reduce said polyvalent metal to said lower polyvalent valence state.

23. A method according to claim 22 wherein:
said formation contains a zone of desired hydrocarbons and a zone of undesired fluid in contact with said hydrocarbon zone, and on continued production said undesired fluid encroaches on said hydrocarbon zone and reduces flow of hydrocarbons therefrom to said borehole; and
said reducing gas comprises naturally occurring hydrogen sulfide associated with said undesired fluid or said petroleum deposit.

24. A method according to claim 23 wherein:
said undesired fluid comprises a zone of natural gas overlying a petroleum deposit; and
said natural gas encroaches on said petroleum deposit by at least one of (a) creating a generally downwardly extending cone around said borehole, or (b) via a fracture or other fissure extending between said gas zone and said deposit.

25. A method according to claim 23 wherein said naturally occurring hydrogen sulfide is supplemented by hydrogen sulfide injected into at least one of said hydrocarbon zone and said zone of undesired fluid.

26. A method according to claim 23 wherein:
said undesired fluid comprises a zone of water lying below a petroleum deposit; and
said water encroaches on said petroleum deposit by at least one of (a) creating a generally upwardly extending zone around said borehole, or (b) via a fracture or other fissure extending between said water zone and said deposit.

27. A method according to claim 23 wherein:
said undesired fluid comprises a zone of water lying below a zone of desired natural gas; and
said water encroaches on said natural gas zone by at least one of (a) creating a generally upwardly extending cone around said borehole, or (b) via a fracture or other fissure extending between said water zone and said gas zone.

* * * * *

UNITED STATES PATENT AND TRADEMARK OFFICE
CERTIFICATE OF CORRECTION

PATENT NO. : 3,848,673
DATED : November 19, 1974
INVENTOR(S) : Richard L. Clampitt and James E. Hessert It is certified that error appears in the above-identified patent and that said Letters Patent are hereby corrected as shown below:

The "Notice" in the left column on the cover page of the patent should read --- The portion of the term of this patent subsequent to April 17, 1990, has been disclaimed ---.

Signed and Sealed this

Third Day of May 1977

[SEAL]

Attest:

RUTH C. MASON
Attesting Officer

C. MARSHALL DANN
Commissioner of Patents and Trademarks